United States Patent
Ushijima et al.

(10) Patent No.: US 8,098,284 B2
(45) Date of Patent: Jan. 17, 2012

(54) METHOD OF MANUFACTURING CAMERA MODULE

(75) Inventors: Akira Ushijima, Yokohama (JP); Takeshi Karuishi, Kitakami (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 259 days.

(21) Appl. No.: 12/612,891

(22) Filed: Nov. 5, 2009

(65) Prior Publication Data

US 2010/0118157 A1    May 13, 2010

(30) Foreign Application Priority Data

Nov. 7, 2008    (JP) .................................. 2008-286527

(51) Int. Cl.
*H04N 5/225* (2006.01)
(52) U.S. Cl. .................................... 348/188; 348/335
(58) Field of Classification Search .................. 348/180, 348/187, 188, 335, 345
See application file for complete search history.

(56) References Cited

U.S. PATENT DOCUMENTS

| | | | |
|---|---|---|---|
| 2007/0133969 A1* | 6/2007 | Ish-Shalom et al. | 396/89 |
| 2009/0128684 A1* | 5/2009 | Apel | 348/360 |
| 2009/0180021 A1* | 7/2009 | Kikuchi et al. | 348/349 |
| 2010/0002126 A1* | 1/2010 | Wenstrand et al. | 348/345 |

FOREIGN PATENT DOCUMENTS

| | | |
|---|---|---|
| JP | 3-5111 | 1/1991 |
| JP | 3-30581 | 2/1991 |
| JP | 11-345955 | 12/1999 |
| JP | 2003-66307 | 3/2003 |
| JP | 2005-57261 | 3/2005 |
| JP | 2005-189414 | 7/2005 |
| JP | 2006-11213 | 1/2006 |
| JP | 2006-208932 | 8/2006 |
| JP | 2007-116510 | 5/2007 |
| WO | WO 2007-043509 A1 | 4/2007 |

OTHER PUBLICATIONS

Office Action issued Dec. 21, 2010, in Japan Patent Application No. 2008-286527 (with English translation).

* cited by examiner

*Primary Examiner* — Jason Whipkey
(74) *Attorney, Agent, or Firm* — Oblon, Spivak, McClelland, Maier & Neustadt, L.L.P.

(57) ABSTRACT

A measuring device includes an actuator which holds a lens unit and moves the lens unit in the direction of the optical axis thereof. A test chart is photographed, with the lens unit being opposed to a reference image pickup device, and the lens unit is positioned at a just-focus position. The gap between the reference image pickup device and the lens unit at this time is reproduced, and an image pickup device, which is to be integrated, and the lens unit are opposed with this gap, and are fixed.

3 Claims, 11 Drawing Sheets

METHOD OF MANUFACTURING CAMERA MODULE

CROSS-REFERENCE TO RELATED APPLICATIONS

This application is based upon and claims the benefit of priority from prior Japanese Patent Application No. 2008-286527, filed Nov. 7, 2008, the entire contents of which are incorporated herein by reference.

BACKGROUND OF THE INVENTION

1. Field of the Invention

The present invention relates to a method of manufacturing a camera module which is built in, for example, a mobile phone.

2. Description of the Related Art

Conventionally, there is known a camera module wherein a semiconductor device (image pickup device), such as a CCD or CMOS, is integrally combined with a lens for focusing an image of a subject (see, e.g. Jpn. Pat. Appln. KOKAI Publication No. 2007-116510 (paragraph [0054])). When this camera module is to be assembled, a chart is photographed by the image pickup device via the lens. While viewing the obtained image of the chart, the position of the lens is adjusted relative to the image pickup device in the optical axis direction, and the lens is fixed to the image pickup device at the just-focus position.

In the method of photographing the chart, adjusting the position of the lens relative to the image pickup device and fixing the lens as such, however, a time of several seconds is needed until a signal is stabilized after powering on each image pickup device. Consequently, in the case of manufacturing many camera modules, the assembly time of camera modules in the entire process becomes very long.

BRIEF SUMMARY OF THE INVENTION

The object of the present invention is to provide a method of manufacturing a camera module, which can reduce the time of assembly.

To accomplish this object, a method of manufacturing a camera module in which an optical member configured to focus an image of a subject on an image pickup surface of an image pickup device is integrated, the method comprising: a measuring step of photographing a subject for a test via the optical member in a state in which the optical member is opposed to a reference image pickup device having the same optical characteristic as the image pickup device, moving the optical member and the reference image pickup device relative to each other in an optical axis direction, and measuring a just-focus position at which the image of the subject is focused on an image pickup surface of the reference image pickup device; and an integrating step of positioning and fixing the image pickup device and the optical member such that the image pickup device, which is an object of integration, and the optical member are opposed with a distance between the reference image pickup device and the optical member at a time when the reference image pickup device and the optical member are disposed at the just-focus position which is measured in the measuring step.

According to the present invention, a subject for a test is photographed, with an optical member being opposed to a reference image pickup device. The reference image pickup device and the optical member are moved relative to each other in the optical axis direction, thereby measuring a just-focus position where the image of the subject is focused on the image pickup surface of the reference image pickup device. The distance between the reference image pickup device and the optical member, at the time when the reference image pickup device and the optical member are disposed at the just-focus position, is reproduced, and an image pickup device, which is a counterpart of integration, and the optical member are opposed and fixed. Therefore, there is no need to supply power to the image pickup device which is to be integrated, no wait time is needed until an output signal of the image pickup device is stabilized, and the assembly time can be reduced in the case of manufacturing a plurality of camera modules.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described in detail with reference to the accompanying drawings.

Figure 1:
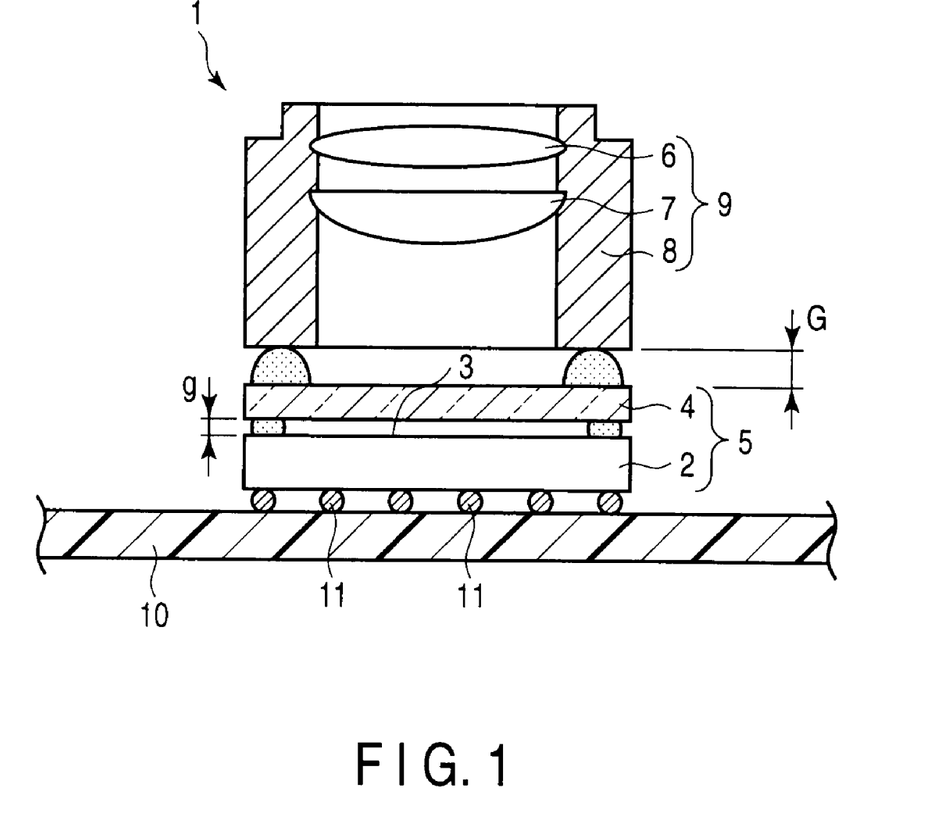
FIG. 1 is a schematic cross-sectional view showing a camera module according to an embodiment of the present invention.

FIG. 1 is a cross-sectional view of a camera module 1. The camera module 1 is built in, for example, a mobile phone.

The camera module 1 is configured such that an image pickup device 5 and a lens unit (optical member) 9 are arranged with a gap G in the optical axis direction of lenses and are integrally attached to each other. The image pickup device 5 is configured such that a cover glass 4 is attached on an image pickup surface 3 of a CMOS sensor chip 2 (hereinafter simply referred to as "sensor chip 2") with a gap g. The lens unit 9 is configured such that two lenses 6 and 7, whose optical axes are aligned, are held by a lens barrel 8.

The lens unit 9 is attached to the cover glass 4 of the image pickup device 5 such that the position of the lens unit 9 is adjusted (focused) in the optical axis direction so that the focal point of the lens unit 9 agrees with the image pickup surface 3 of the sensor chip 2. The camera module 1 is built in the mobile phone by electrically connecting the image pickup device 5 to a wiring board 10 with use of solder balls 11.

The description here is directed to the case in which the camera module 1 is connected to the wiring board 10 with use of the solder balls 11. However, the camera module 1 may be attached to the wiring board 10 by wire bonding. The sensor chip 2 of the image pickup device 5 is not limited to the above-described CMOS sensor, and may be some other semiconductor device such as a CCD sensor chip.

In the meantime, there are individual variances in optical characteristics of the image pickup device 5 and lens unit 9, which constitute the above-described camera module 1. Thus, if the image pickup device 5 and lens unit 9 are simply attached with a fixed gap G, the camera module 1 would fail to normally operate. In other words, when the above-described camera module 1 is manufactured, the position of the lens unit 9 needs to be precisely adjusted relative to the image pickup device 5 in the optical axis direction so that an image of a subject, when photographed by the image pickup device 5 via the lens unit 9, may be focused on the image pickup surface 3 of the image pickup device 5.

However, in a conventional adjustment method, each time the lens unit 9 is positioned and attached to the image pickup device 5, power is supplied to the image pickup device 5 to photograph a test chart, and the relative position of the lens unit 9 and the image pickup device 5 is adjusted while an image of the test chart is being monitored. If this conventional adjustment method is adopted, it is necessary to power on the image pickup device 5 each time the camera module 1 is assembled, and a predetermined wait time (usually, about two seconds) is needed until a signal of the image pickup device 5 is stabilized after power-on. Consequently, if this method is adopted and many camera modules 1 are manufactured, the process time of the entire manufacturing process increases and the productivity lowers.

Figure 2:
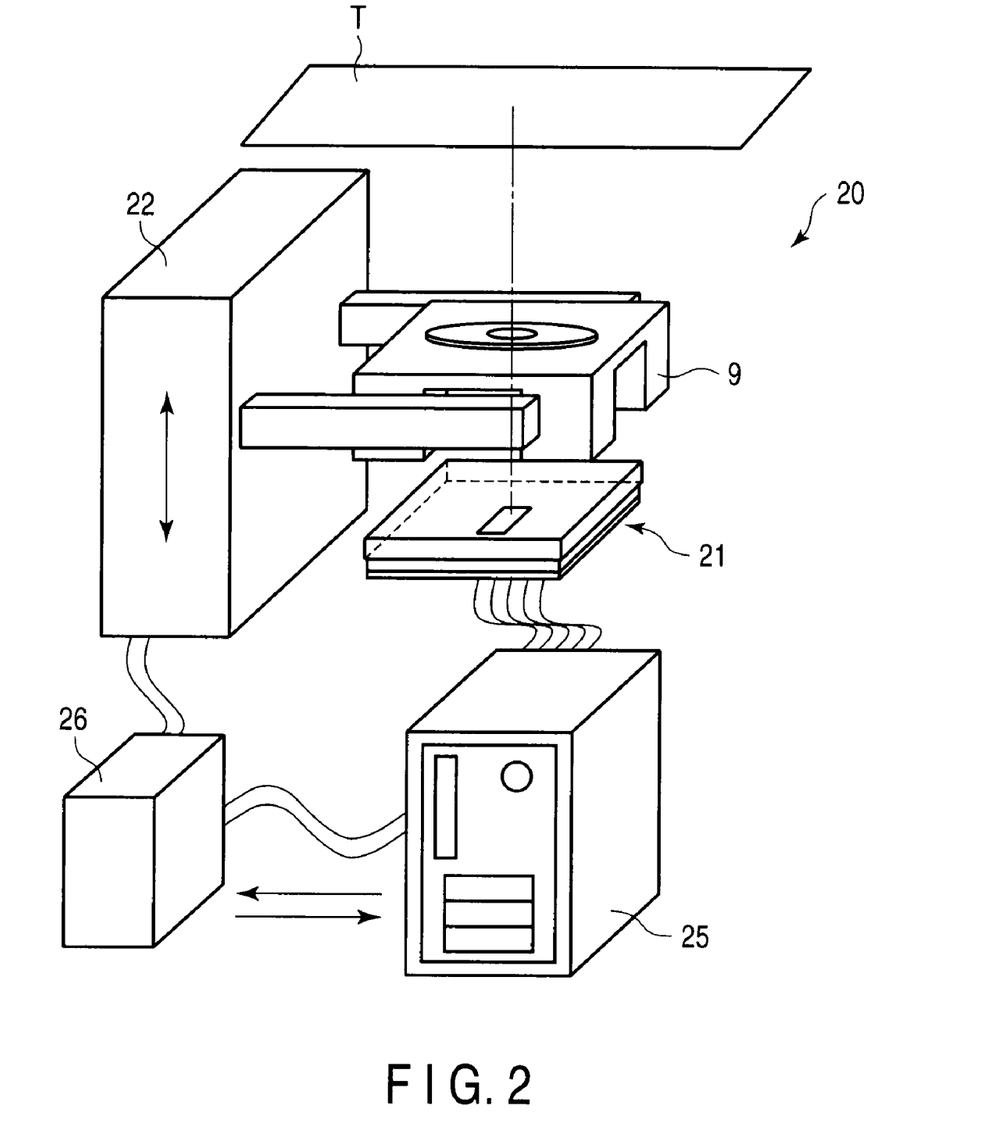
FIG. 2 is a schematic view of a measuring device which measures the optical characteristic of a lens unit of the camera module of FIG. 1.

Taking the above into account, in the present embodiment, a measuring device 20 shown in FIG. 2 is used to successively measure the optical characteristic unique to each lens unit 9 (i.e. a just-focus position of each lens unit 9 relative to a reference image pickup device 21). Each lens unit 9 is disposed at the measured just-focus position and opposed to the image pickup device 5 which is to be integrated with the lens unit 9, and each lens unit 9 is attached to the image pickup device 5. Specifically, the gap G between the lens unit 9 that is set on the measuring device 20 and the reference image pickup device 21, at the time when the lens unit 9 is disposed at the just-focus position, is reproduced as the gap between the lens unit 9 and an actual image pickup device 5 which becomes a counterpart of integration, and the lens unit 9 and the image pickup device 5 are fixed.

By measuring the optical characteristics of the plural lens units 9 by using the reference image pickup device 21 in the above-described manner, there is no need to supply power to each image pickup device 5 that is a counterpart of attachment, and the process time of the entire process, which is needed for the manufacture of the camera module 1, can greatly be reduced.

As shown in FIG. 2, the measuring device 20 includes an actuator 22 which detachably holds the lens unit 9 that is the object of measurement at the position opposed to the image pickup surface of the reference image pickup device 21, and vertically moves the held lens unit 9 in a direction away from and toward the image pickup surface. The lens unit 9 is set on the actuator 22 in such a position that the optical axis of the lens unit 9 extends in a direction perpendicular to the image pickup surface, and the lens unit 9 is movable along the direction of the optical axis.

Figure 6:
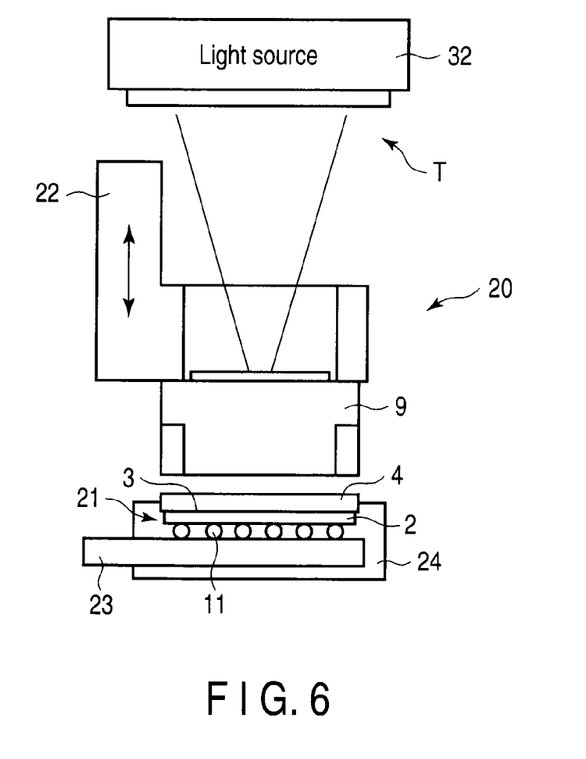
FIG. 6 is an operational explanatory view showing the state in which a test chart is photographed, with the lens unit being opposed to a reference image pickup device.

As shown in a schematic view of FIG. 6, the reference image pickup device 21 has the same structure as the above-described image pickup device 5, and is configured such that a cover glass 4 is attached on an image pickup surface 3 of a chip 2 with a gap g (not shown). In short, the reference image pickup device 21 has substantially the same optical characteristic as the image pickup device 5 of the camera module 1.

The reference image pickup device 21 is electrically connected to a wiring board 23 of the measuring device 20 via solder balls 11, and is integrally fixed to the wiring board 23 by a resin 24. Specifically, the reference image pickup device 21 is stationarily fixed to a frame (not shown) of the measuring device 20. The angle of attachment of the reference image pickup device 21 is set at such an angle that the image pickup surface 3 of the sensor chip 2 becomes horizontal.

In addition, the measuring device 20, as shown in FIG. 2, includes a focus PC 25 which supplies power to the reference image pickup device 21 via the wiring board 23 (FIG. 6) and processes an image signal which is photoelectrically converted by the reference image pickup device 21, and a main controller 26. The main controller 26 delivers a command to the focus PC 25, transmits/receives various data to/from the focus PC 25, and controls the driving of the actuator 22.

In preparation for the manufacture of the camera module 1, an optical distance D0 of the above-described reference image pickup device 21 is measured in advance. The optical distance D0, in this context, refers to an optical path length which is determined by the height position of the image pickup surface 3 of the sensor chip 2, the thickness of the cover glass 4 and the gap g. As will be described later, the optical distance D0 can be calculated by measuring the heights of the image pickup surface 3 and the front surface and back surface of the cover glass 4 by using a laser displacement meter. The optical distance D0 of the reference image pickup device 21, which is measured in advance, is stored as a calculation reference of a correction value $\alpha$, which will be described later. The method of calculating the optical distance D0 and correction value $\alpha$ will be described later in detail.

Figure 3:
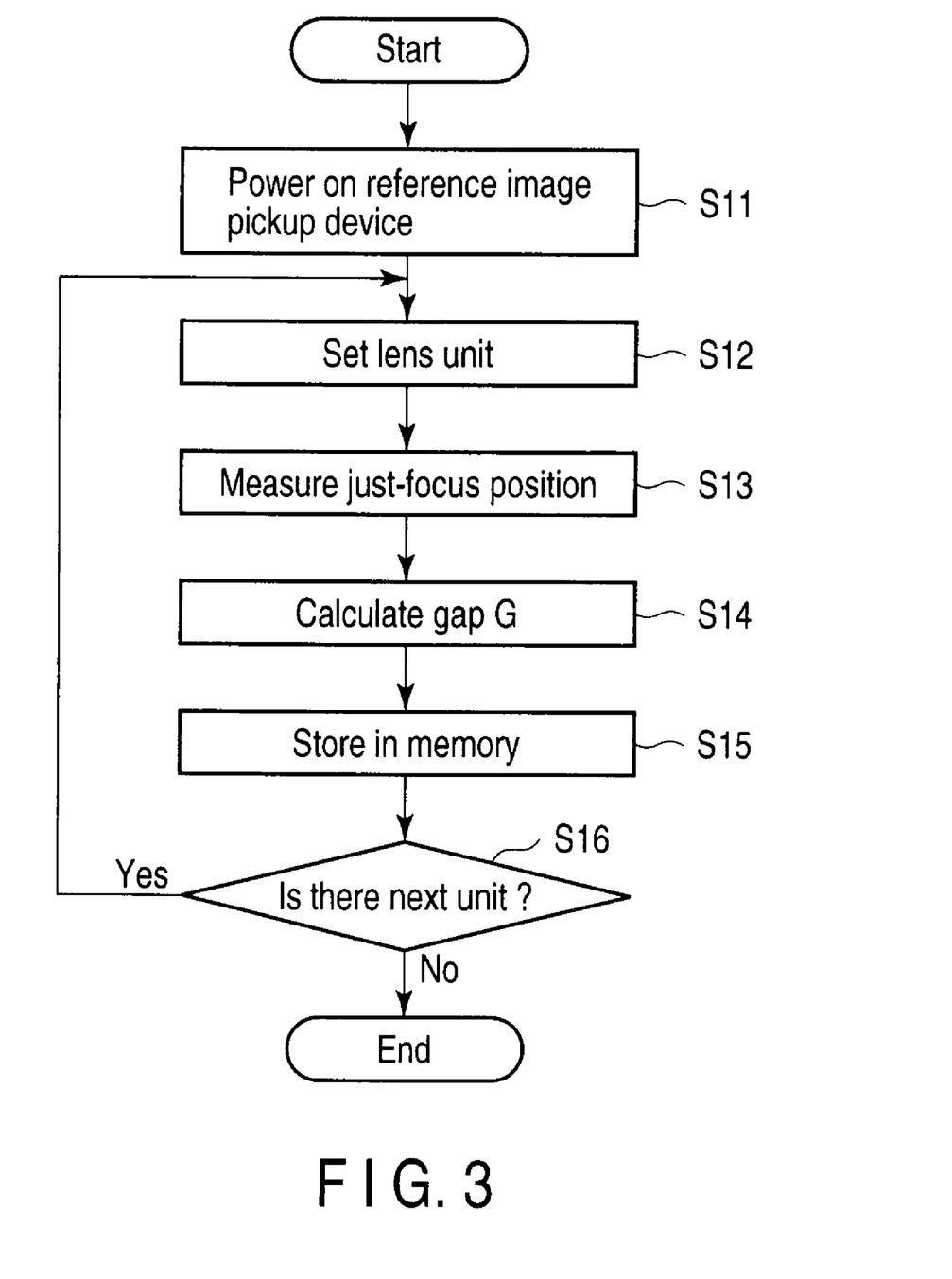
FIG. 3 is a flow chart for explaining the operation by the measuring device of FIG. 2.
Figure 4:
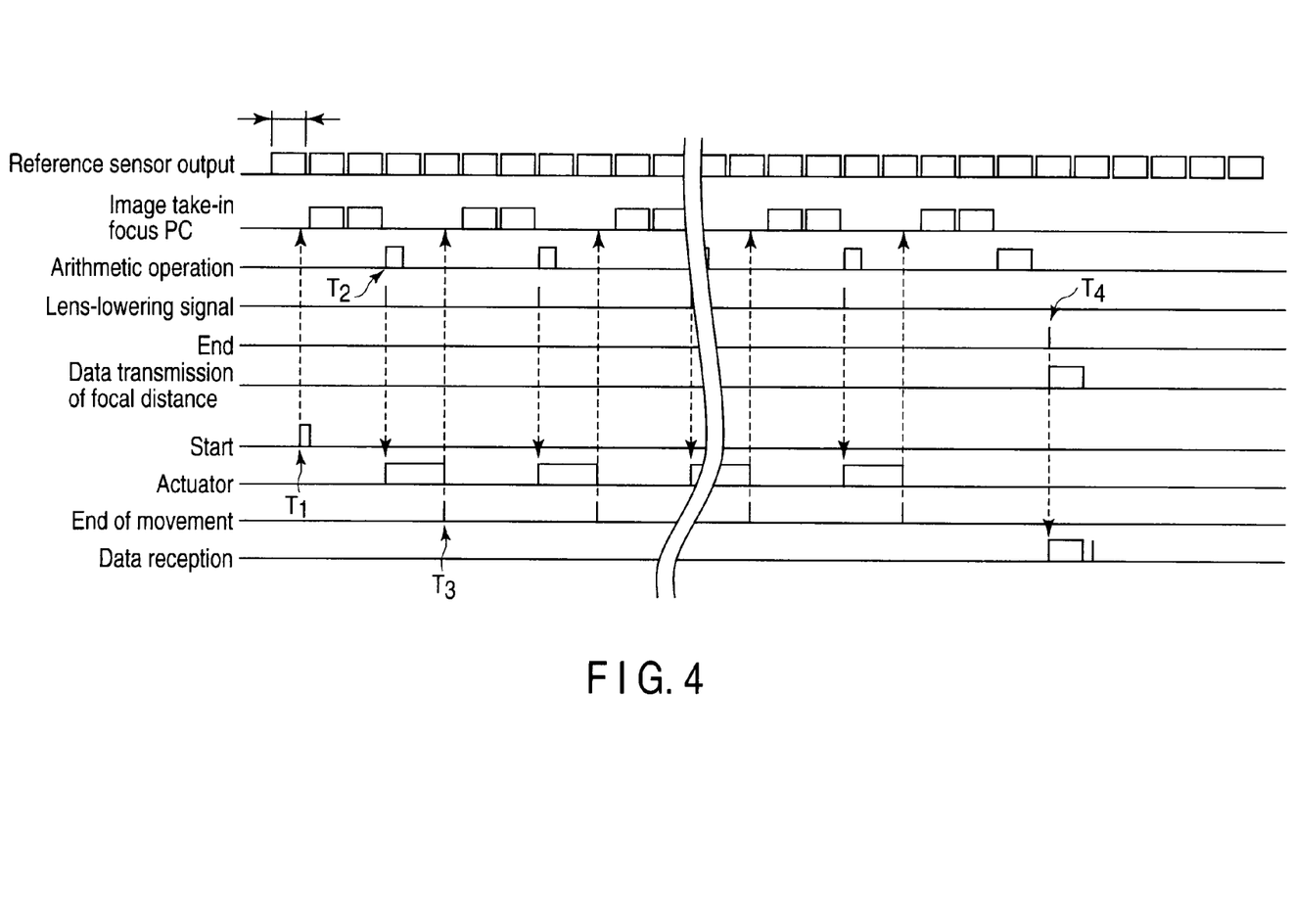
FIG. 4 is a timing chart for explaining the operation timing of the measuring device of FIG. 2.

FIG. 3 is a flow chart for explaining the method of measuring the optical characteristic of the lens unit 9 by using the above-described measuring device 20. FIG. 4 is a timing chart for explaining the operation timing of the measuring device 20.

Figure 5:
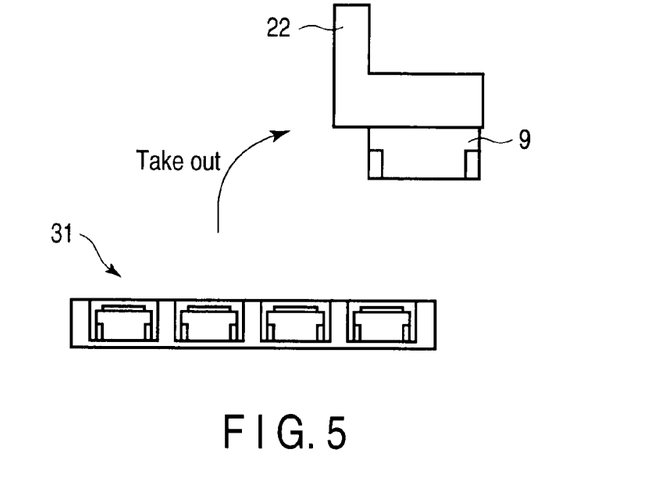
FIG. 5 is an operational explanatory view for explaining an operation of taking out the lens unit.

In the case where the optical characteristic of the lens unit 9 is measured, power is first supplied to the sensor chip 2 of the reference image pickup device 21, thereby to stabilize a signal (step S11 in FIG. 3). Then, as shown in FIG. 5, a lens unit 9 which is an object of measurement is taken out of a tray 31, and is set on the actuator 22 of the measuring device 20 (step S12 in FIG. 3).

In this state, as shown in FIG. 6, a test chart T (a subject for a test), on the back side of which a light source 32 is disposed, is photographed by the reference image pickup device 21 via the lens unit 9, and the lens unit 9 is intermittently moved by the actuator 22. At this time, the lens unit 9 is moved over a range including the height position (hereinafter referred to as "just-focus position") of the lens unit 9, at which the image of the test chart T is focused on the image pickup surface 3 of the sensor chip 2 of the reference image pickup device 21. The lens unit 9 is gradually lowered from above the just-focus position, and moved down beyond at least the just-focus position.

As has been described above, the just-focus position differs among individual lens units 9. Thus, in the present embodiment, the just-focus position of a lens unit which is a reference lens unit, is measured in advance by using the measuring device 20. By setting the height position of this reference lens unit as a zero reference, the lens unit 9 that is the object of measurement is moved downward from a home position, which is 50 μm above the zero reference, to a position which is 70 μm below the zero reference, intermittently at intervals of 20 μm.

As shown in the timing chart of FIG. 4, if the test chart T is photographed via the lens unit 9 by powering on the reference image pickup device 21, image data, which is photoelectrically converted by the reference image pickup device 21, is output from the reference image pickup device 21 as a reference sensor output. Then, if a trigger signal is output from the main controller 26 (timing T1 in FIG. 4), the focus PC 25 starts taking-in of the image data.

Figure 7:
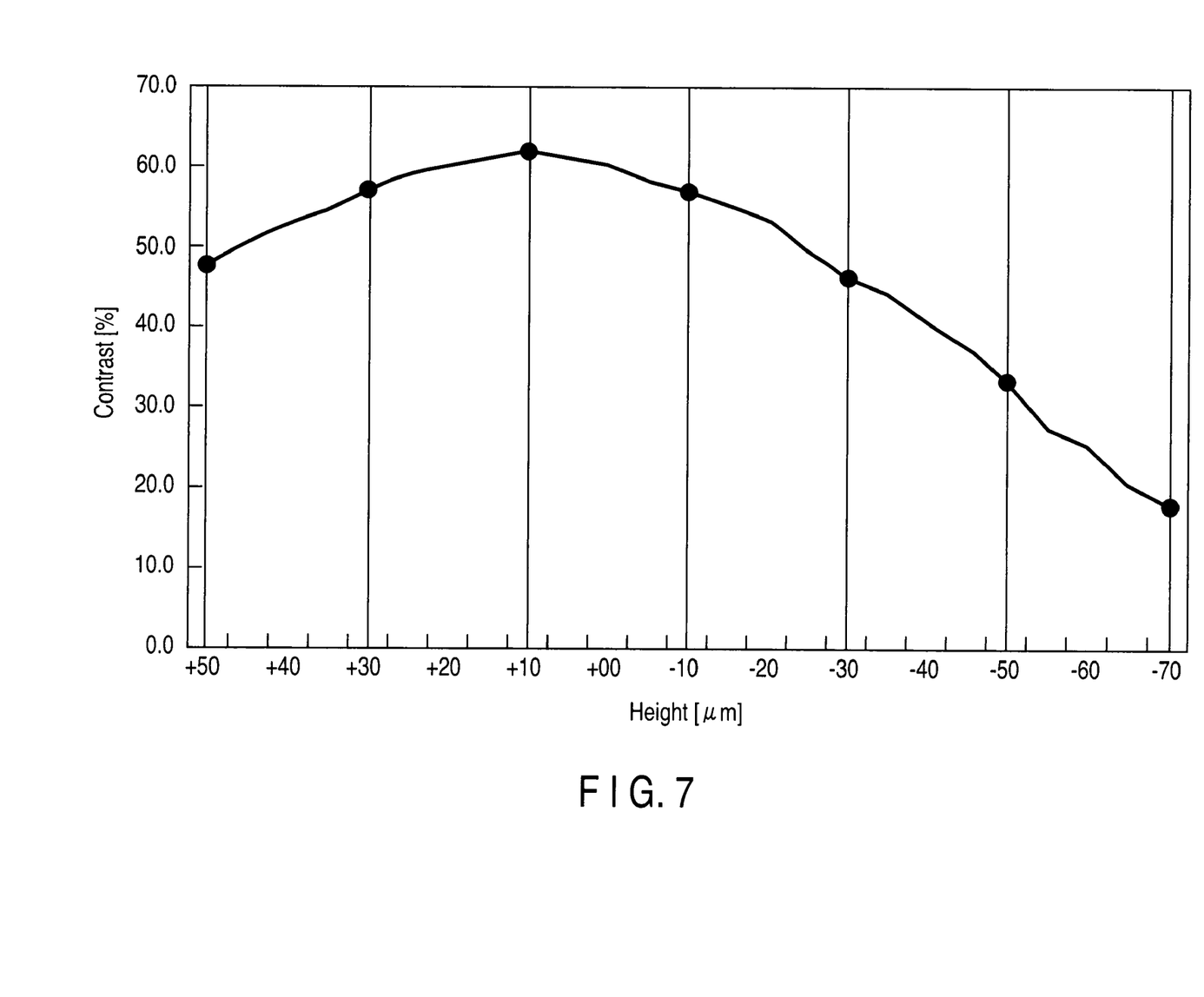
FIG. 7 is a graph showing a measurement result obtained by the measuring device of FIG. 2.

At timing T1, the actuator 22 rests at the home position, and the lens unit 9 is disposed at the home position which is 50 μm above the just-focus position. Responding to the trigger signal that is output from the main controller 26, the focus PC 25 takes in the image data that is output from the reference image pickup device 21, and calculates the contrast [%] of the photographed image. As shown in FIG. 7, the data that is calculated by the focus PC 25 is stored in a memory (not shown) in association with the height position of the lens unit 9.

At timing T2 at which the focus PC 25 takes in the image data and starts an arithmetic operation, the main controller 26 outputs a lens-lowering signal to the actuator 22, and the actuator 22 lowers the lens unit 9 by 20 μm while the focus PC 25 is performing the arithmetic operation.

If the lens unit 9 is lowered from the home position by 20 μm, the main controller 26 instructs the focus PC 25 to start taking-in of the next image data, with the end of movement of the lens unit 9 being used as a trigger at timing T3. Thus, the focus PC 25 takes in the next image data. Then, the focus PC 25 executes an arithmetic operation on the contrast on the basis of the taken-in image data, and the result of the arithmetic operation is stored in the memory.

The measuring device 20 continues the above-described series of operations until the lens unit 9 is lowered to the position that is 70 μm below the just-focus position. The measuring device 20 calculates the contrasts of images which are obtained when the lens unit 9 is at the height positions of 50 μm, 30 μm, 10 μm, −10 μm, −30 μm, −50 μm and −70 μm, respectively, and stores the calculated contrasts in the memory (FIG. 7).

After the contrast of the last taken-in image is calculated, the focus PC 25 calculates, from the graph of FIG. 7, the height position of the lens unit 9 at which the contrast takes a peak value, that is, the just-focus position (step S13 in FIG. 3). At timing T4, the data of the just-focus position is sent to the main controller 26 as data relating to the focal distance which is unique to the lens unit 9. In the present embodiment, as shown in FIG. 7, the just-focus position of the lens unit 9 is a position which is 10 μm above the zero reference.

After the main controller 26 receives the data from the focus PC 25 at timing T4, the main controller 26 calculates the gap G between the lens unit 9 and the reference image pickup device 21 when the lens unit 9 is disposed at the just-focus position (step S14 in FIG. 3), and stores the gap G in the memory (not shown) (step S15). At this time, the main controller 26 stores, as the data relating to the focal distance unique to each lens unit 9, the gap G calculated in step S14, for example, in association with a serial number for identifying the lens unit.

Until there remains no lens unit 9 which is the object of measurement of optical characteristics (NO in step S16), the measuring device 20 continues the above-described process of step S11 to step S15, and the measuring device 20 measures the optical characteristics of all lens units 9 which are to be measured, that is, the gap G, and stores the gap G. This description is directed to the case of measuring the gap G as the optical characteristic unique to the lens unit 9. Alternatively, the actual focal distance of each lens unit 9 may be measured.

Figure 8:
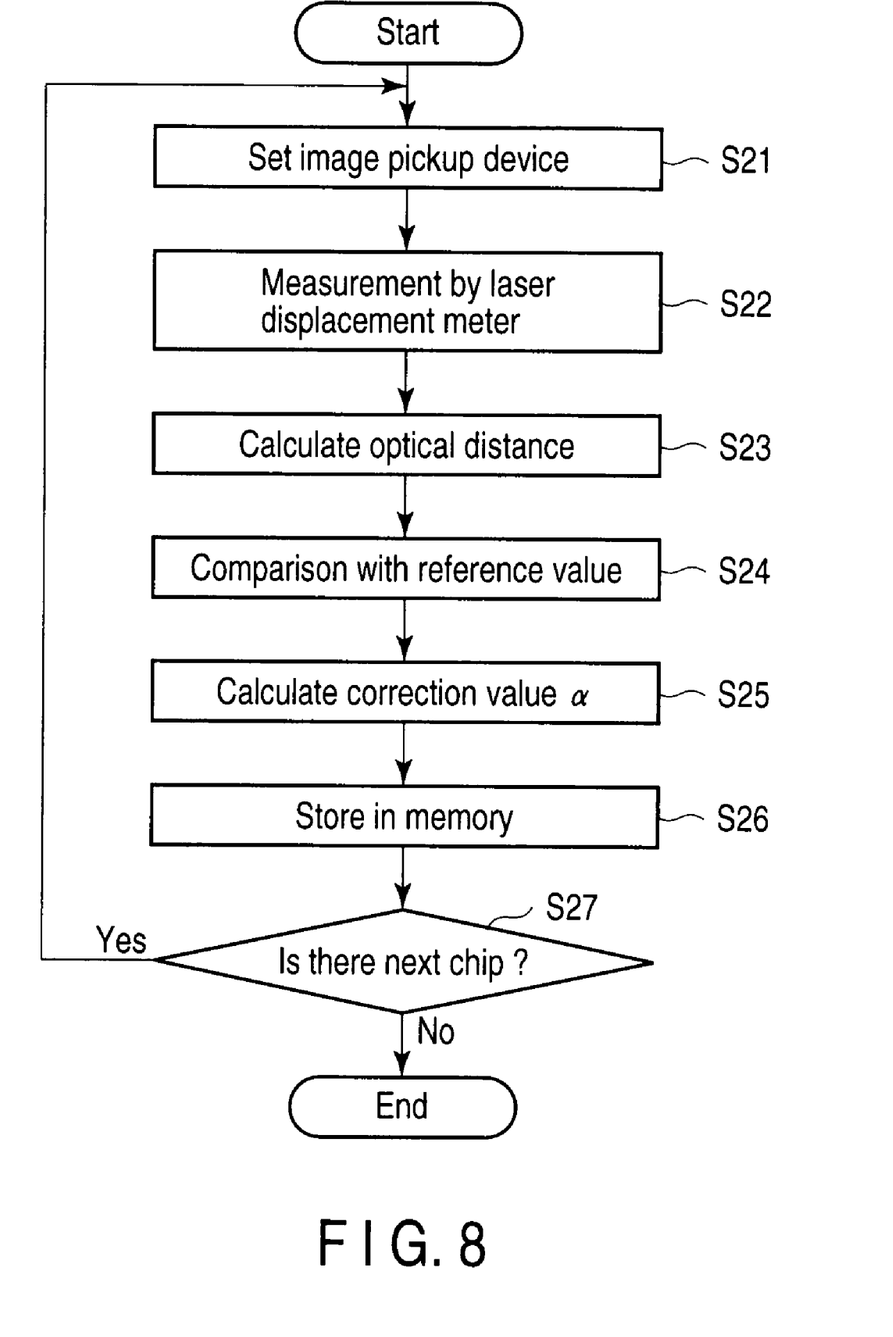
FIG. 8 is a flow chart for explaining an operation of calculating the optical characteristic of the image pickup device.

FIG. 8 is a flow chart for explaining a method of measuring the optical characteristic of the image pickup device 5 which is to be integrated with the lens unit 9, with respect to which the gap G has been measured as described above. A description is given of the method of calculating the optical distance D of each image pickup device 5, calculating the difference between the optical distance D and the optical distance D0 of the above-described reference image pickup device 21, and calculating a correction value α. It is assumed that the optical distance D0 of the above-described reference image pickup device 21 is measured by the method as described here. The dimensions of the respective parts of the reference image pickup device 21 are measured in advance.

Figure 9:
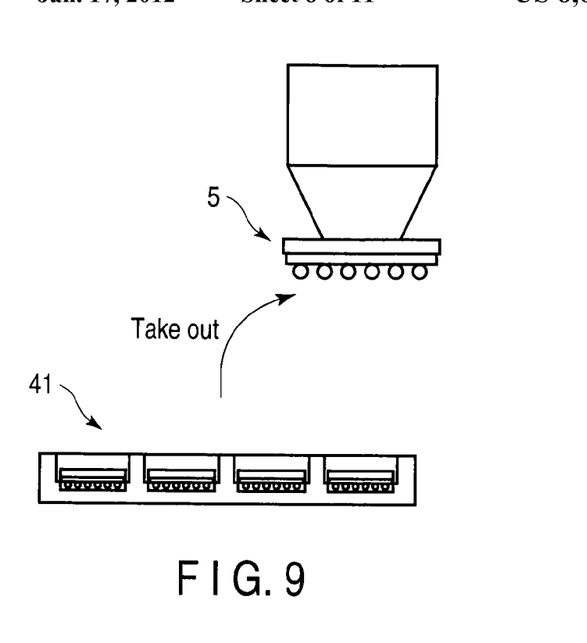
FIG. 9 is an operational explanatory view for explaining an operation of taking out the image pickup device.
Figure 10:
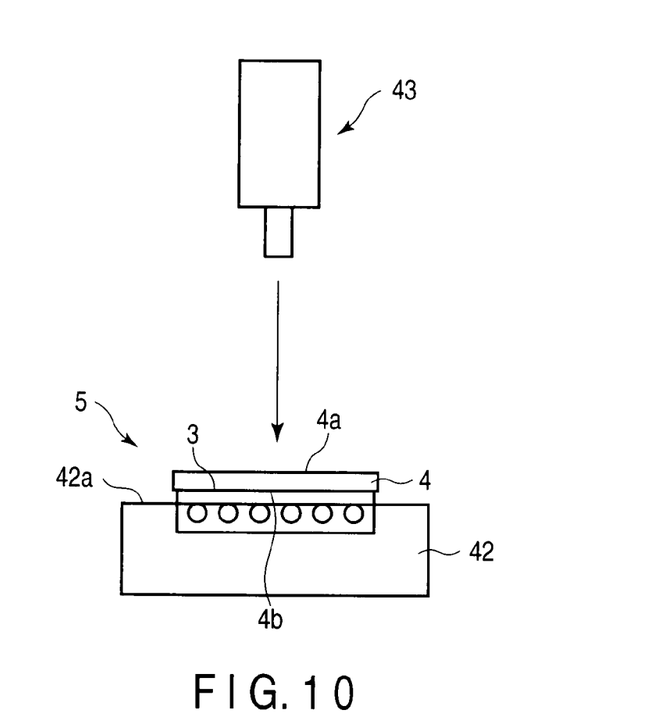
FIG. 10 is an operational explanatory view for explaining an operation of measuring the optical distance of the image pickup device.

To start with, as shown in FIG. 9, an image pickup device 5, which is an object of measurement, is taken out of a tray 41. The image pickup device 5 is set on a stage 42, as shown in FIG. 10 (step S21 in FIG. 8). The stage 42 has an upper surface 42*a* with a recess portion for receiving solder balls 11 of the image pickup device 5. The back surface of the sensor chip 2 (FIG. 1) of the image pickup device 5 is put in contact with, and disposed, on the upper surface 42*a*. FIG. 9 and FIG. 10 omit depiction of the gap g between the image pickup surface 3 of the sensor chip 2 of the image pickup device 5 and the back surface 4*b* of the cover glass 4.

The height H1 of the image pickup surface 3 of the image pickup device 5, the height H2 of the back surface 4*b* of the cover glass 4 and the height H3 of the front surface 4*a* of the cover glass 4 are measured by a laser displacement meter 43 which is disposed, spaced apart, above the stage 42 (step S22). At this time, the measurement reference H0 is set at, for example, the upper surface of the stage 42. In the present embodiment, since the length of one side of the image pickup device 5 is about 5 mm, the height of each of the surfaces 3, 4*a* and 4*b* is measured at one point. Alternatively, the number of points for measurement may be set to be two or more.

Further, in an arithmetic unit not shown, the optical distance G' of the image pickup device 5 is calculated, as expressed by the equation below, on the basis of the heights H1, H2 and H3 of the respective surfaces, which are measured by the laser displacement meter 43, and the refractive index n of the glass 4 (step S23). At this time, the difference between the thickness of the cover glass 4 of the reference image pickup device 21 and the thickness of the cover glass 4 of the image pickup device 5 that is the object of measurement (H3−H2) is set to be ΔT, and the difference between the height of the image pickup surface 3 of the reference image pickup device 21 and the height H1 of the image pickup surface 3 of the image pickup device 5 that is the object of measurement is set to be ΔH. The optical characteristic unique to the lens unit 9 is set to be the above-described gap G.

$$G'=G+\Delta T\times n+\Delta H$$

Then, in the arithmetic unit, the optical distance G' calculated in step S23 is compared with the optical distance D0 (reference value) of the reference image pickup device 21 that is calculated in step S14 in FIG. 3 and is stored in step S15 (step S24). The difference between the optical distance G' and the optical distance D0 (reference value) is calculated as the correction value α unique to the image pickup device 5 (step S25), and stored in the memory (not shown) (step S26). In this case, the correction value α is ΔT×n+ΔH. The correction value α is stored in association with, e.g. the serial number for identifying the image pickup device 5.

The process of steps S21 to S26 is continued until there remains no image pickup device 5 that is the object of measurement (NO in step S27), and the correction value α is stored as the optical characteristic of each image pickup device 5.

Figure 11:
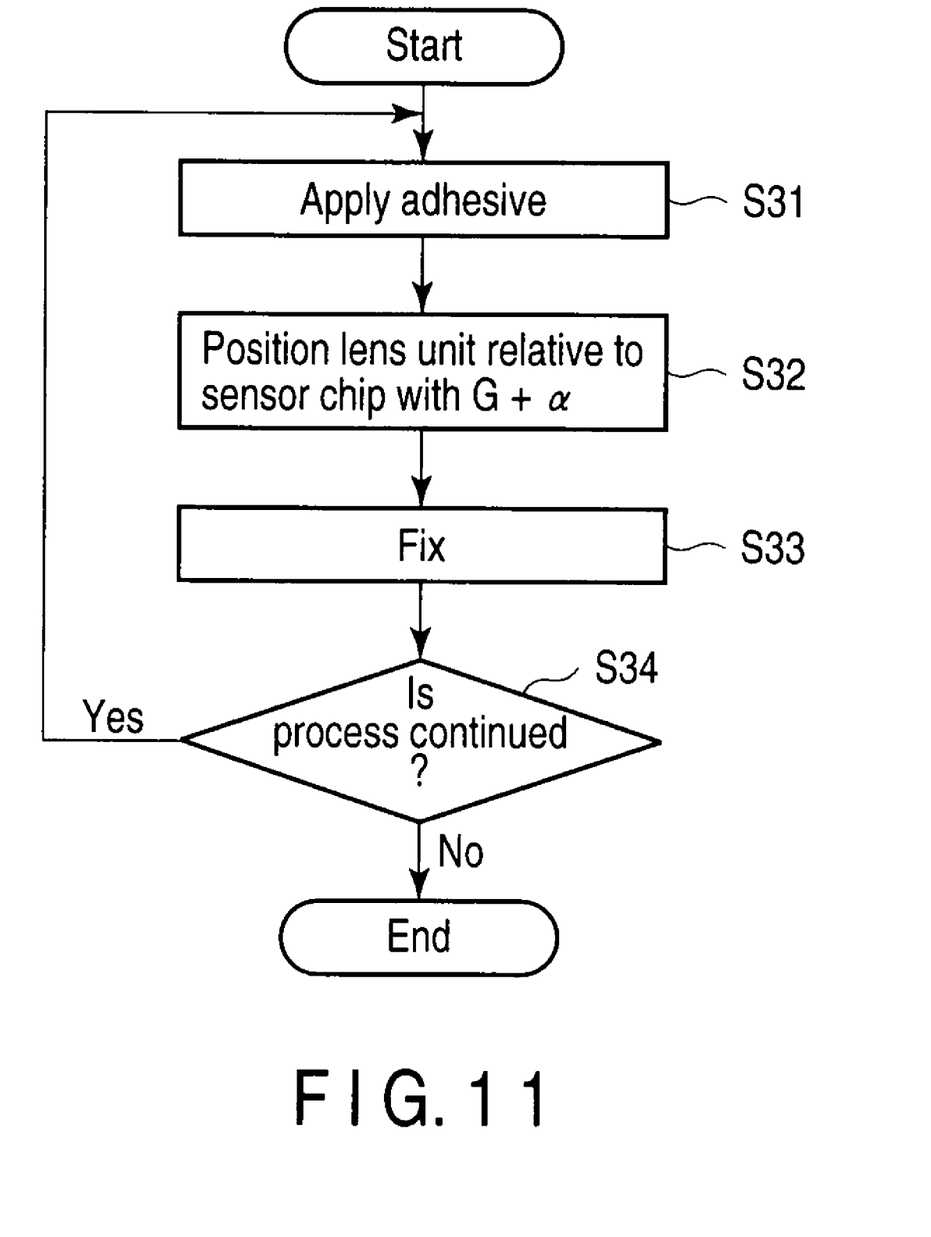
FIG. 11 is a flow chart for explaining the operation of integrating the lens unit, the optical characteristic of which has been measured, and the image pickup device, the correction value for which has been calculated.

Thereafter, as shown in FIG. 11, the lens unit 9, with respect to which the gap G is calculated as described above, and the image pickup device 5, with respect to which the correction value α is calculated as described above, are opposed to each other with the correction distance G+α, and are fixed. Thus, the camera module 1 is manufactured.

Figure 12:
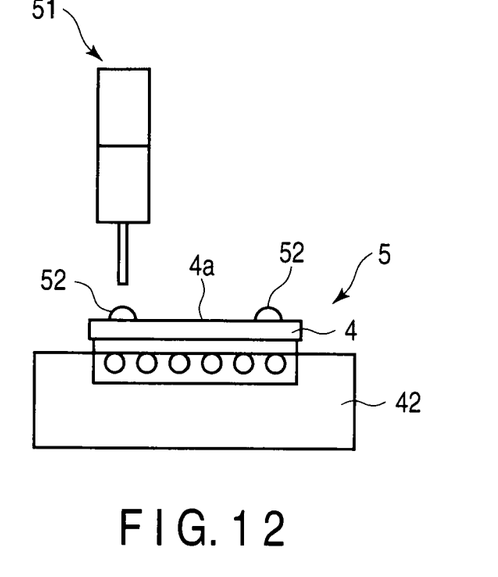
FIG. 12 is an operational explanatory view for explaining the operation of applying an adhesive on the image pickup device which is set on a stage.

In this case, to start with, as shown in FIG. 12, an ultraviolet-curing adhesive 52 is applied by a dispenser 51 to the surface 4a of the cover glass 4 of the image pickup device 5 which is disposed on the stage 42 (step S31 in FIG. 11). The position of application of the adhesive 52 is set on an outside region which does not overlap the effective region of the image pickup surface 3 of the sensor chip 2.

The description here is directed to the case in which the adhesive is applied in a continuous process, without moving the image pickup device 5 that is set on the stage 42 in step S21 in FIG. 8. Alternatively, the image pickup device 5, with respect to which the correction value α is calculated, may be shifted onto another stage in a subsequent step, and then the adhesive may be applied. Specifically, since the correction value α is stored in the memory in association with each image pickup device 5, the application of the adhesive can be performed in another step by reading out the correction value α at an arbitrary timing.

Figure 13:
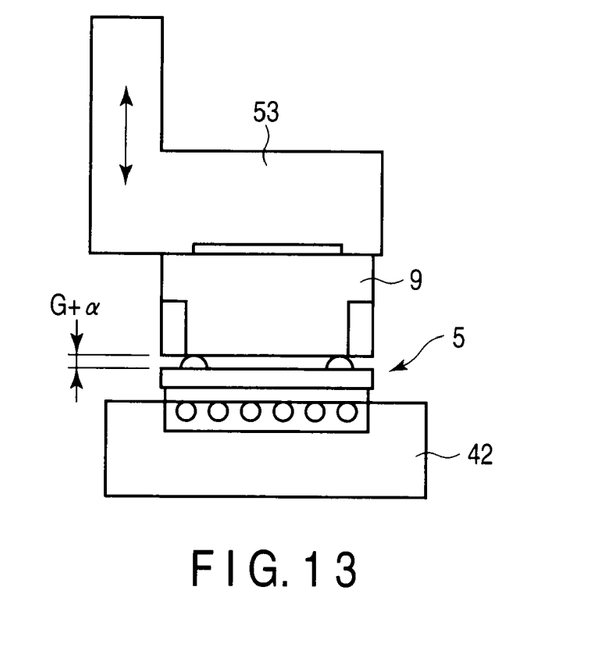
FIG. 13 is an operational explanatory view for explaining the operation of positioning the lens unit relative to the image pickup device.
Figure 14:
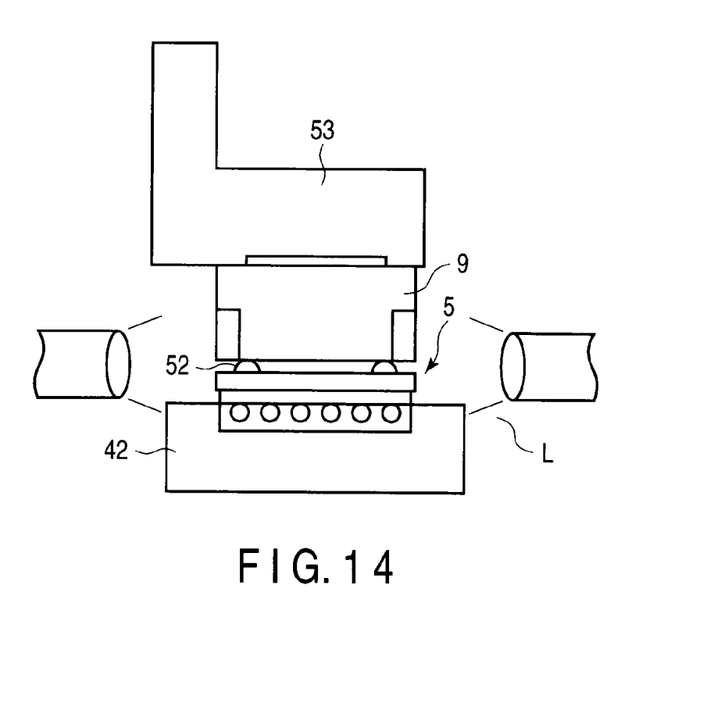
FIG. 14 is an operational explanatory view for explaining the operation of curing the adhesive and fixing the image pickup device and the lens unit.

Following the application of the adhesive 52 in step S31, the lens unit 9, which is the counterpart of integration, is held by an actuator 53, as shown in FIG. 13, and is opposed to the image pickup device 5 on the stage 42. The lens unit 9 is moved in the optical axis direction, and the distance between the lens unit 9 and the image pickup device 5 is adjusted. At this time, the actuator 53 is operated so that the gap between the surface 4a of the cover glass 4 of the image pickup device 5 and a lower end 9b of the lens unit 9 becomes the correction distance G+α (step S32).

At this time, as the actuator 53, the actuator 22 that has been described in FIG. 6 may be used as such. In other words, following step S13 in FIG. 3, the lens unit 9 that is held by the actuator 22 may successively be opposed to the image pickup device 5 on the stage 42, which has undergone the process of step S22 in FIG. 8, and the distance between the lens unit 9 and the image pickup device 5 may be adjusted.

Figure 15:
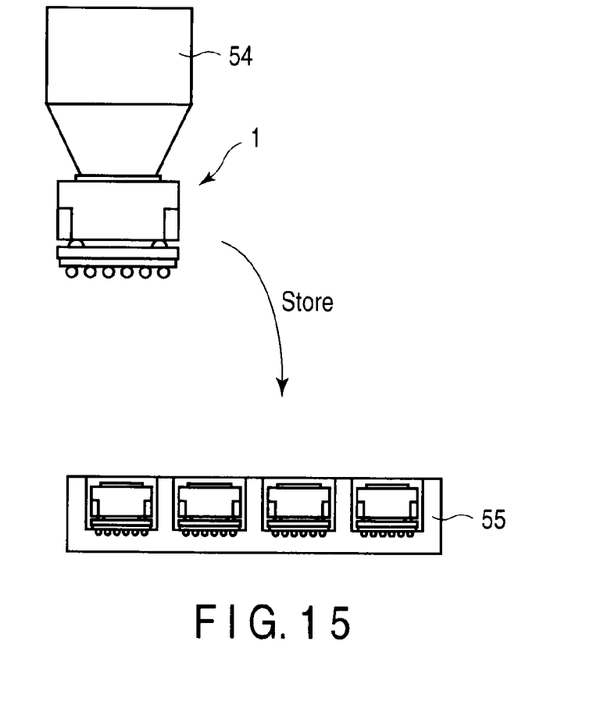
FIG. 15 is an operational explanatory view for explaining the operation of storing the camera module in which the image pickup device and the lens unit are fixed.

After the image pickup device 5 and the lens unit 9 are positioned in step S32, ultraviolet L is radiated on the adhesive 52 that is applied between the image pickup device 5 and the lens unit 9, thereby curing the adhesive 52 and fixing the image pickup device 5 and the lens unit 9 (step S33). Thus, the camera module 1 is manufactured. As shown in FIG. 15, the camera module 1 is sucked and held by a suction arm 54, moved from the stage 42 to a tray 55, and stored in the tray 55. Subsequently, the process of steps S31 to S33 is repeated until there remains neither image pickup device 5 nor lens unit 9, which are to be fixed (NO in step S34).

As has been described above, according to the present embodiment, the optical characteristics of a plurality of lens units 9 are measured by using the reference image pickup device 21 which is in the normal power-on state. Thereby, there is no need to supply power to each of image pickup devices 5 which are counterparts of attachment, and the process time in the entire process, which is needed for the manufacture of the camera module 1, can greatly be reduced. In addition, in order to correct the difference in optical characteristics among image pickup devices 5, the correction value α is calculated by calculating the optical distance D of each image pickup device 5. Therefore, an error in optical characteristic of the image pickup device 5 can be eliminated, and the camera module 1 with high reliability can be manufactured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the above-described embodiment is directed to the case in which the optical characteristic of the lens unit 9 is measured, and the lens unit 9 is combined with the image pickup device 5 with respect to which the correction value α is calculated. However, in the case where the error in dimension of the image pickup device 5 is small and there is little difference from the optical distance D, the process illustrated in FIG. 8 may be omitted, and the lens unit 9 and image pickup device 5 may be integrated so as to reproduce only the gap G that is calculated in the process of FIG. 3.

What is claimed is:

1. A method of manufacturing a camera module in which an optical member configured to focus an image of a subject on an image pickup surface of an image pickup device is integrated, the method comprising:

a measuring step of photographing a subject for a test via the optical member in a state in which the optical member is opposed to a reference image pickup device having the same optical characteristic as the image pickup device, moving the optical member and the reference image pickup device relative to each other in an optical axis direction, and measuring a just-focus position at which the image of the subject is focused on an image pickup surface of the reference image pickup device; and an integrating step of positioning and fixing the image pickup device and the optical member such that the image pickup device, which is an object of integration, and the optical member are opposed with a distance between the reference image pickup device and the optical member at a time when the reference image pickup device and the optical member are disposed at the just-focus position which is measured in the measuring step.

2. The method according to claim 1, further comprising:

a calculation step of calculating a correction value for correcting an error of an optical distance of the image pickup device relative to the reference image pickup device, wherein in the integrating step, the image pickup device and the optical member are positioned with a correction distance which is obtained by adding the correction value, which is calculated in the calculation step, to the distance.

3. The method according to claim 2, wherein in the measuring step, the reference image pickup device, which is in a power-on state, is used, and the distance between the reference image pickup device and each of a plurality of said optical members is successively measured, in the calculation step, the correction value of each of a plurality of said image pickup devices, which are to be integrated with the plurality of optical members, is calculated, and in the integrating step, the image pickup device, with respect to which the correction value is calculated in the calculation step, and the optical member, with respect to which the distance is measured in the measuring step, are positioned and fixed with a correction distance which is obtained by adding the correction value to the distance.

* * * * *